United States Patent
Ullmann et al.

(10) Patent No.: US 9,783,141 B2
(45) Date of Patent: Oct. 10, 2017

(54) CONNECTING DEVICE FOR A STEERING WHEEL OF A MOTOR VEHICLE, MOTOR VEHICLE AND METHOD FOR MOUNTING A STEERING WHEEL ON A STEERING COLUMN

(71) Applicant: VALEO Schalter und Sorensen GmbH, Bietigheim-Bissingen (DE)

(72) Inventors: Tim Ullmann, Bietigheim-Bissingen (DE); Daniela Pikart, Bietigheim-Bissingen (DE); Viktoria Schwarz, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/027,043

(22) PCT Filed: Sep. 25, 2014

(86) PCT No.: PCT/EP2014/070431
§ 371 (c)(1),
(2) Date: Jun. 29, 2016

(87) PCT Pub. No.: WO2015/049145
PCT Pub. Date: Apr. 9, 2015

(65) Prior Publication Data
US 2016/0297381 A1    Oct. 13, 2016

(30) Foreign Application Priority Data
Oct. 2, 2013 (DE) .................. 10 2013 016 507

(51) Int. Cl.
*H01R 39/00* (2006.01)
*B60R 16/027* (2006.01)
*H01R 35/02* (2006.01)

(52) U.S. Cl.
CPC .......... *B60R 16/027* (2013.01); *H01R 35/02* (2013.01); *H01R 2201/26* (2013.01)

(58) Field of Classification Search
CPC .... B60R 16/027; H01R 35/02; H01R 2201/26
(Continued)

(56) References Cited

U.S. PATENT DOCUMENTS

| | | | | |
|---|---|---|---|---|
| 3,490,255 A | * | 1/1970 | Curtindale | ............ B60R 25/002 |
| | | | | 70/239 |
| 4,593,781 A | * | 6/1986 | Galtier | ................. B62D 5/0448 |
| | | | | 180/444 |

(Continued)

FOREIGN PATENT DOCUMENTS

| DE | 41 29 450 A1 | 4/1992 |
|---|---|---|
| DE | 696 08 537 T2 | 9/2000 |

(Continued)

OTHER PUBLICATIONS

International Search Report issued in PCT/EP2014/070431 mailed on Dec. 11, 2014 (3 pages).

(Continued)

*Primary Examiner* — Jean F Duverne
(74) *Attorney, Agent, or Firm* — Osha Liang LLP

(57) ABSTRACT

The invention relates to a connecting device (1) for transmitting electrical signals to and/or from a steering wheel (23) of a motor vehicle, having a positionally fixed component (2) for positionally fixed installation in the motor vehicle, having a hub part (3) which is rotatably mounted on the positionally fixed component (2) and which serves for connection to the steering wheel (23), and having a locking element (6) which is movably mounted on a bearing part (3) and which, during the connection of the hub part (3) to the steering wheel (23), is movable counter to a spring force of a spring element (14) from an installation position, in which (Continued)

a blocking bar (9) of the locking element (6) blocks the rotation of the hub part (3) relative to the positionally fixed component (2), into an operating position, in which the rotation of the hub part (3) is enabled, wherein the connecting device (1) has a plunger (18) which is mounted movably relative to the locking element (6) and which, during the connection of the hub part (3) to the steering wheel (23), moves the locking element (6) into the operating position, in which the locking element (6) is held spaced apart from the steering wheel (23) by the plunger (18).

14 Claims, 6 Drawing Sheets

(58) Field of Classification Search
USPC .......................................................... 439/15
See application file for complete search history.

(56) References Cited

U.S. PATENT DOCUMENTS

| | | | | |
|---|---|---|---|---|
| 2006/0240937 | A1* | 10/2006 | Shiotsu | B62D 5/008 |
| | | | | 475/286 |
| 2007/0228703 | A1* | 10/2007 | Breed | B60N 2/0232 |
| | | | | 280/735 |
| 2012/0011959 | A1 | 1/2012 | Park et al. | |
| 2013/0000953 | A1 | 1/2013 | Park et al. | |
| 2013/0075183 | A1* | 3/2013 | Kochidomari | B60K 7/0007 |
| | | | | 180/292 |

FOREIGN PATENT DOCUMENTS

| | | |
|---|---|---|
| DE | 199 26 278 C1 | 2/2001 |
| DE | 601 14 330 T2 | 4/2006 |
| DE | 10 2006 046 413 A1 | 4/2008 |
| EP | 1 182 090 A2 | 2/2002 |
| EP | 1 410 971 A2 | 4/2004 |
| EP | 1 462 296 A2 | 9/2004 |
| EP | 1 674 343 B1 | 2/2008 |
| EP | 2 522 562 A2 | 11/2012 |
| JP | H07-282935 A | 10/1995 |
| JP | H08-138818 A | 5/1996 |
| JP | H10-275669 A | 10/1998 |
| JP | 2001-347904 A | 12/2001 |
| JP | 2009-081029 A | 4/2009 |
| JP | 2011-119247 A | 6/2011 |

OTHER PUBLICATIONS

Written Opinion of the International Searching Authority issued in PCT/EP2014/070431 mailed on Dec. 11, 2014 (5 pages).
German Search Report issued in Patent application No. 10 2013 016 507.5 mailed on May 19, 2014 (8 pages).
Notification of Reasons for Refusal issued in corresponding Japanese Patent Application No. 2016-519917, dated Mar. 21, 2017 (7 pages).
Communication from the Examining Division and Annex to the Communication issued in corresponding European Patent Application No. 14 772 351.4, dated May 26, 2017 (4 pages).

* cited by examiner

CONNECTING DEVICE FOR A STEERING WHEEL OF A MOTOR VEHICLE, MOTOR VEHICLE AND METHOD FOR MOUNTING A STEERING WHEEL ON A STEERING COLUMN

The invention relates to an electrical connecting device for transmitting electrical signals to and/or from a steering wheel of a motor vehicle, having a positionally fixed component for positionally fixed installation in the motor vehicle, having a hub part which is rotatably mounted on the positionally fixed component and which serves for connection to the steering wheel, and having a locking element which is movably mounted on a bearing part and which, during the connection of the hub part to the steering wheel, is movable counter to a spring force of a spring element from an installation position into an operating position. Whereas in the installation position a blocking bar of the locking element blocks the rotation of the hub part relative to the positionally fixed component, the rotation of the hub part is enabled in the operating position of the locking element. The invention also relates to a motor vehicle having a connecting device of said type, and to a method for installing a steering wheel on a steering column of a motor vehicle.

Electronic steering column modules for motor vehicles are already known from the prior art. Such steering column modules commonly comprise a connecting device, which serves for the transmission of electrical signals between positionally fixed components and the steering wheel. The known steering column modules normally comprise a positionally fixed component, or a housing, which is attached in positionally fixed fashion in the motor vehicle, for example to a casing, arranged fixedly with respect to a vehicle body, of the steering column, in which casing the steering shaft is rotatably mounted. On the positionally fixed component there is rotatably mounted a hub part which can be attached rotationally conjointly to the steering wheel. In the positionally fixed component there may be arranged, for example, a flat spiral spring or a so-called flat conductor via which electrical signals—for example electrical supply voltages— are transmitted between devices situated in the steering wheel and units arranged positionally fixedly in the vehicle. By way of a flat spiral spring of said type, it is for example the case that an electrical heater in the steering wheel is supplied with electrical energy. Furthermore, it is also possible for an airbag in the steering wheel to be actuated via the flat spiral spring. A further example is operating elements integrated in the steering wheel, which operating elements are electrically connected by way of the flat spiral spring to control units situated outside the steering wheel. The flat spiral spring in this case typically comprises multiple electrical lines which are electrically insulated with respect to one another. The flat spiral spring itself constitutes a flat resilient cable—a flat cable.

As already stated, the flat spiral spring is normally accommodated in the positionally fixed component that constitutes a housing. The flat spiral spring is in this case equipped with electrical contact elements which are provided as terminals on the hub part, by way of which terminals the flat spiral spring is electrically connected to the components on the steering wheel. In addition to a flat spiral spring of said type, there may also be arranged in the steering column module a steering angle sensor, for measuring the present steering angle, and/or a torque sensor, which serves for detecting the present torque applied to the steering shaft. It is also possible for steering-column switches to be mounted on the steering column module.

A steering column module is known for example from EP 1 462 296 A2. The embodiment of a steering column with a positionally fixed casing and with a rotary shaft rotatably mounted in the casing is known from EP 1 410 971 A2.

During the installation of the steering wheel, said steering wheel is rotatably attached to said hub part of the steering column module. This means that the steering wheel is installed on the steering column, and in the process mounted axially onto the steering shaft, in such a way that the rotation of the steering wheel simultaneously also effects a rotation of the hub part of the steering column module. Here, the rotational movement is normally transmitted by way of driver elements. A driver element on the steering wheel is operatively connected to a driver element of the hub part. One of the driver elements may be in the form of a pin-like bolt; the other driver element may be provided as a sleeve with a receptacle in which the bolt is received, or into which the bolt is inserted, during the installation of the steering wheel, such that the stated operative connection is produced.

During the installation of the steering wheel, it should be ensured that the rotational movement of the hub part relative to the housing or relative to the positionally fixed component is blocked until the steering wheel is connected to the hub part. For this purpose, in the prior art, use is already made of a locking element by means of which the rotational movement of the hub part is mechanically prevented or locked. Such a solution is known for example from EP 1 674 343 B1. During the installation of the steering wheel, the locking element is moved into an operating position or an enable position, in which the rotational movement of the hub part relative to the housing is enabled. Here, the locking element is moved counter to the spring force of a compression spring. A disadvantage of said prior art is the fact that, owing to the embodiment of the spring element, a relatively large spring travel is required, whereby, overall, a relatively large amount of structural space is taken up. There is however only limited availability of such structural space in particular in the region of a steering wheel.

A connecting device of the generic type mentioned in the introduction also emerges, so as to be known, from DE 696 08 537 T2.

During the installation of the steering wheel, it is firstly the case that the steering column module or the connecting device is installed on the steering column, and then the steering wheel is mounted. The installation of the steering wheel is thus performed in an axial direction, that is to say the steering wheel is fitted or mounted onto the steering column axially. During the mounting of the steering wheel, the axial face side of a hub of the steering wheel is brought into contact with the locking element of the connecting device, and pushes the locking element into the operating position, in which the rotation of the hub part is enabled. Here, the locking element is held in the operating position continuously by the axial face side of the hub of the steering wheel. It has now been found that, during the operation of the motor vehicle, axial movements of the steering wheel can occur, which in turn lead to a relative movement of the locking element relative to the steering wheel. This causes additional noises during operation, and such generation of noise in turn reduces driving comfort.

It is an object of the invention, in the case of a connecting device of the generic type mentioned in the introduction, to reduce the generation of noise in relation to the prior art.

Said object is achieved according to the invention by way of a connecting device, by way of a motor vehicle, and by way of a method having the features of the respective independent patent claims. The dependent patent claims, the description and the figures relate to advantageous embodiments of the invention.

A connecting device according to the invention is designed for transmitting electrical signals to and/or from a steering wheel of a motor vehicle, and comprises a positionally fixed component for positionally fixed installation in the motor vehicle (specifically in particular on a steering column) and also comprises a hub part which is rotatably mounted on the positionally fixed component and which can be coupled rotationally conjointly to the steering wheel. The connecting device furthermore comprises a locking element which is movably, in particular pivotably, mounted on a bearing part and which, during the connection of the hub part to the steering wheel, in particular during the axial mounting of the steering wheel onto the steering column, is movable counter to a spring force of a spring element from an installation position into an operating position. In the installation position of the locking element, a blocking bar of the locking element blocks the rotation of the hub part relative to the positionally fixed component. By contrast, in the operating position of the locking element, the rotation of the hub part is enabled. It is provided according to the invention that the connecting device has a plunger which is mounted movably relative to the locking element and which, during the connection of the hub part to the steering wheel, in particular during the mounting of the steering wheel onto the steering column, moves the locking element into the operating position, in which the locking element is held spaced apart from the steering wheel, or from the hub of the steering wheel, by the plunger.

By means of a plunger of said type, by means of which the locking element is, in the operating position, held spaced apart from the steering wheel, it is possible for the generation of noise to be reliably reduced in relation to the prior art. Specifically, the locking element is no longer in contact with the steering wheel, such that even axial movements of the steering wheel during operation of the motor vehicle do not lead to generation of noise. The plunger thus has the effect that the locking element, in its unlocked position or in the operating position, is spaced apart from the steering wheel, such that contact between the locking element and steering wheel, and generation of noise caused as a result, is reliably prevented.

The connecting device preferably constitutes a steering column module, or a part of such a steering column module, which is mounted on a steering column of the motor vehicle and which serves for the transmission of electrical signals between the steering wheel and devices arranged positionally fixedly in the motor vehicle. For this purpose, the connecting device may comprise a flat spiral spring, which is arranged in particular in the positionally fixed component. Provision may also be made for at least one sensor, in particular a steering angle sensor and/or a torque sensor, to also be integrated into the connecting device or the steering column module. In general terms, the connecting device or the steering column module is to be understood to be an electrical module which is used at the interface between the rotatable steering wheel and the components that are arranged positionally fixedly in the vehicle.

The positionally fixed component is preferably in the form of a housing in which said flat spiral spring, which serves for the transmission of the electrical signals, is accommodated.

In one embodiment, it is provided that, during the connection of the hub part to the steering wheel, in particular during the mounting of the steering wheel onto the steering column, the locking element is initially regionally in contact with the steering wheel and is moved by way of the steering wheel, in particular by way of the hub of the steering wheel, into an intermediate position in which the plunger is brought into contact with the steering wheel. Subsequently, the locking element is moved by way of the plunger from the intermediate position into the operating position, in which the locking element is no longer in contact with the steering wheel. Here, in the intermediate position, the plunger is preferably in contact with, and thus touches, a region of the steering wheel other than the locking element itself. In particular, the plunger may be brought into contact not with the axial face side of the hub of the steering wheel but with a rear side of a steering wheel pot-shaped structure which bears the hub. Said rear side is normally milled and polished and/or provided with a coating, such that here, contact with the plunger does not lead to increased generation of noise. By virtue of the fact that the plunger is actuated directly by the steering wheel, the use of further intermediate elements is rendered superfluous, and it is thus possible overall to provide a connecting device which is particularly compact and saves structural space and has a reduced number of components.

The locking element is preferably mounted on the bearing part so as to be pivotable between the installation position and the operating position. By means of this pivotable mounting of the locking element, too, it is possible overall to provide a connecting device which is compact and saves structural space, because no great distances have to be covered by the locking element. Furthermore, reliable locking and unlocking of the movement of the hub part relative to the positionally fixed component can be made possible in this way.

It has furthermore proven to be particularly advantageous if the plunger is displaceably mounted on and/or in a guide part. Here, the plunger may be mounted so as to be displaceable in an axial direction, such that in particular, a linear movement of the plunger in an axial direction causes a pivotable movement of the locking element. Even in the case of a pivotable mounting of the locking element, a relatively large spacing between the locking element and the steering wheel can thereby be made possible, and thus the generation of noise can be reliably prevented.

The plunger is preferably of elongate form and thus of altogether pin-like form. Here, the plunger preferably extends in an axial direction, such that the main direction of extent of the plunger is oriented in an axial direction. The movement of the plunger thus takes place, overall, substantially along the axial direction or along the main direction of extent of the plunger, and thus along an axis of rotation of the hub part.

The locking element is particularly preferably articulated on the plunger. In this way, the substantially linear movement of the plunger can be reliably converted into a pivotable movement of the locking element into the operating position. The steering axis about which the plunger is articulated on the locking element extends in this case preferably parallel to, and spaced apart from, the pivot axis about which the locking element is pivotably mounted on the bearing part.

As already stated, the plunger may be of elongate form and mounted so as to be movable along its main direction of extent. Then, the locking element may have a through aperture through which the plunger extends. In this way, structural space can be saved in a radial direction with respect to the axis of rotation of the hub part and in a circumferential direction.

The spring element is preferably in the form of a leg spring which is coiled around a main body, which is in particular of circular cylindrical form, of the locking element. A first leg of the leg spring may be supported on the locking element, and a second leg of the leg spring may be supported on the bearing part. By means of such an embodiment of the spring element as a leg spring, the first leg of which is fixed to the locking element itself and the second leg of which is fixed to the bearing part, it is possible overall to provide a connecting device which is compact and saves structural space. Firstly, it is specifically the case that the spring travel of the spring element coincides with the pivoting travel of the locking element. Secondly, no additional structural space is required for the spring element itself, because said spring element is coiled around the main body of the locking element itself. In particular in relation to a compression spring such as is used in the prior art, it is thus possible to save a relatively large amount of structural space in particular in an axial direction, of which there is only limited availability in particular in the region of a steering wheel. The embodiment of the spring element as a leg spring furthermore has the advantage that the locking element can, owing to the spring force, be moved into the installation position again in a particularly reliable manner when the steering wheel is removed for example during servicing work.

In one embodiment, provision is made for the bearing part to be formed integrally with the hub part, such that the locking element is pivotably mounted directly on the hub part, or the bearing part is, as it were, formed by a region of the hub part. Such an arrangement of the locking element directly on the hub part has the advantage that, during the installation of the steering wheel, the locking element is easily accessible and can thus be actuated directly by the steering wheel, such that the movement of the locking element into the operating position occurs, as it were, automatically during the insertion of the steering wheel into the hub part.

Provision may also be made for the main body of the locking element, about which the leg spring is coiled, to be of circular cylindrical form. Here, the locking element may be mounted on the bearing part so as to be pivotable about a cylinder longitudinal axis of the cylindrical main body. In this way, particularly stable and operationally reliable mounting of the locking element on the bearing part is ensured. Furthermore, secure seating of the leg spring on the cylindrical main body can be made possible in this way.

The bearing part preferably has a receptacle into which the main body of the locking element is inserted. The main body of the locking element is thus mounted pivotably in sliding fashion in the receptacle of the bearing part. This ensures robust mounting of the locking element, and consequently a correspondingly long service life of the connecting device.

The bearing part may also have a holding arm of resilient form, which holding arm bears—in particular by way of its free end—against the main body of the locking element and by means of which holding arm the main body is thus held in the receptacle. Said holding arm is formed preferably in one piece with the bearing part, and in particular in one piece with the hub part. A holding arm of said type ensures that the locking element, or the main body thereof, can be held firmly and stably within said receptacle. Specifically, in other words, the holding arm pushes the main body of the locking element in the direction of the receptacle, such that, overall, secure seating of the main body in the receptacle is ensured. By way of the resilient form of the holding arm, it is also ensured that the locking element can be removed from the receptacle, and thus dismounted from the bearing part, in non-destructive fashion.

Thus, in one embodiment, it may be provided that the locking element is arranged on the bearing part so as to be releasable in non-destructive fashion. Identical hub parts can thus be used both for connecting devices with a locking element and for devices which make do without a locking element.

It has proven to be advantageous if the locking element has an actuation section which projects from the main body and which can be actuated by way of the steering wheel during the connection of the hub part to the steering wheel. The actuation section may for example be in the form of a lug which protrudes from the main body and which, in particular, extends into a cylindrical cavity of the hub part into which the steering wheel can be inserted. During the insertion of the steering wheel into the cavity of the hub part, the actuation section is thus contacted directly by the steering wheel itself, and actuated such that the locking element is pivoted into the operating position.

The first leg of the leg spring may in particular be fixed to the actuation section or else fixed to the blocking bar itself. In particular, the first leg of the leg spring is received in an aperture of the actuation section or of the blocking bar and thereby fixed. The second leg of the leg spring may in turn be fixed to the hub part, for example received in a corresponding aperture in the hub part.

The locking of the rotation of the hub part relative to the positionally fixed component is made possible in particular by the fact that the blocking bar of the blocking element engages, in the installation position, into a depression and thus interacts, with blocking action, with a wall that delimits the depression. Said depression is preferably formed in the positionally fixed component. If the locking element is pivoted into the operating position, the blocking bar is thus moved out of the depression, such that the rotational movement of the hub part is made possible. By way of such a positively locking action, particularly reliable locking is ensured.

A motor vehicle according to the invention, in particular passenger motor vehicle, comprises a connecting device according to the invention.

A method according to the invention serves for the installation of a steering wheel on a steering column of a motor vehicle. A positionally fixed component of a connecting device or of a steering column module for the transmission of electrical signals to and/or from the steering wheel is arranged in positionally fixed fashion on the steering column, and a hub part of the connecting device is rotatably mounted on the positionally fixed component, which hub part is connected rotationally conjointly to the steering wheel. During the connection of the hub part to the steering wheel, in particular during the axial mounting of the steering wheel onto the steering column, a locking element, which is movably mounted on a bearing part of the connecting device, is moved counter to a spring force of a spring element from an installation position, in which a blocking bar of the locking element blocks the rotation of the hub part relative to the positionally fixed component, into an operating position, in which the rotation of the hub part is enabled. During the connection of the hub part to the steering wheel, a plunger which is mounted movably relative to the locking element moves the locking element into the operating position, in which the locking element is held spaced apart from the steering wheel by the plunger.

The preferred embodiments presented with reference to the connecting device according to the invention, and the advantages thereof, apply correspondingly to the motor vehicle according to the invention and to the method according to the invention.

Further features of the invention will emerge from the claims, from the figures and from the description of the figures. All of the features and combinations of features mentioned above in the description, and the features and combinations of features mentioned below in the description of the figures and/or shown only in the figures, may be used not only in the respectively specified combination but also in other combinations or individually.

The invention will now be discussed in more detail on the basis of a preferred exemplary embodiment and with reference to the appended drawings, in which.

Figure 1:
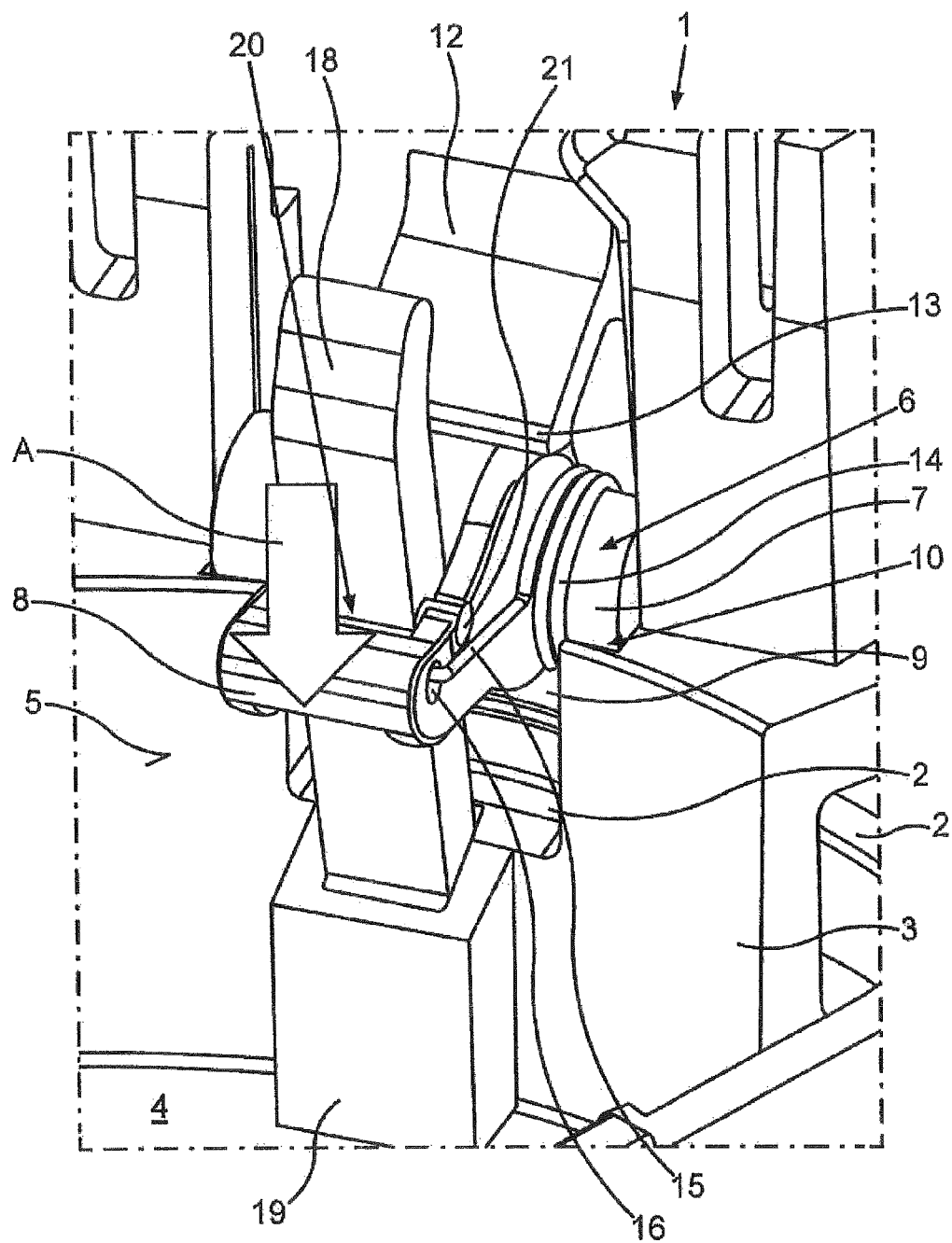
FIG. 1 is a schematic and perspective illustration of a region of a connecting device as per an embodiment of the invention, wherein a locking element is situated in an installation position.

FIG. 1 shows parts of a connecting device, denoted as a whole by 1, as per an embodiment of the invention. The connecting device 1 is in the form of a steering column module and comprises a positionally fixed component 2 in the form of a housing, which component is designed to be installed positionally fixedly in a passenger motor vehicle, specifically on the steering column or on a housing of the steering column. A hub part 3 is rotatably mounted on the positionally fixed component 2. The hub part 3 has a circular cylindrical cavity 4 which is delimited radially to the outside by a radial inner circumference 5 of the hub part 3. The hub part 3 is coupled rotationally conjointly to a steering wheel of the passenger motor vehicle, wherein the steering wheel, and more precisely a hub of the steering wheel, is inserted axially into the cavity 4 and, here, fitted onto a shaft.

In a manner known per se, there is arranged in the positionally fixed component 2 a flat spiral spring which serves for the transmission of electrical signals between the steering wheel and devices arranged positionally fixedly in the vehicle. Said flat spiral spring can be coupled electrically to the steering wheel by way of terminals (not illustrated).

Before the steering wheel is inserted into the cavity 4 and thus fully installed, it should be ensured that the hub part 3 cannot rotate relative to the positionally fixed component 2. For this purpose, the connecting device 1 comprises a locking element 6 which, overall, is of unipartite form and has a circular cylindrical main body 7, from which an actuation section 8, and separately therefrom a blocking bar 9 (cf. FIGS. 3 to 6), project outward radially and thus perpendicularly to the axis of the main body 7. The main body 7 is inserted, axially with respect to the axis of rotation of the hub part 3, into a receptacle 10 which is formed in the hub part 3 and which is in the form of an axial depression (with respect to the axis of rotation of the hub part 3), and said main body is mounted there so as to be pivotable about a cylinder longitudinal axis 11 (cf. FIGS. 3 to 6) of the main body 7. Here, the main body 7 is arranged in sliding fashion in the receptacle 10. In order that the main body 7 can be securely held in the receptacle 10, the hub part 3 has a resilient holding arm 12 which is in the form of a lug or tongue and which points in the direction of the cavity 4. A free end 13 of the holding arm 12 bears against an outer circumference of the cylindrical main body 7, such that the holding arm 12 securely holds the main body 7 in the receptacle 10. The holding arm 12 thus ensures secure fixing of the cylindrical main body 7 radially (with respect to the cylinder axis 11). Owing to the spring action of the holding arm 12, the locking element 6 is mounted in the receptacle 10 so as to be releasable in non-destructive fashion, and can thus be dismounted.

In the exemplary embodiment, the hub part 3 thus also functions as a bearing part on which the locking element 6 is pivotably mounted.

A leg spring 14 as a spring element is coiled around the cylindrical main body 7. A first leg 15 of the leg spring 14 is fixed in an aperture 16 which is formed in the actuation section 8. The first leg 15 is thus supported on the actuation section 8. A second leg (not illustrated in any more detail in the figures) of the leg spring 14 is in turn fixed to the hub part 3.

Figure 2:
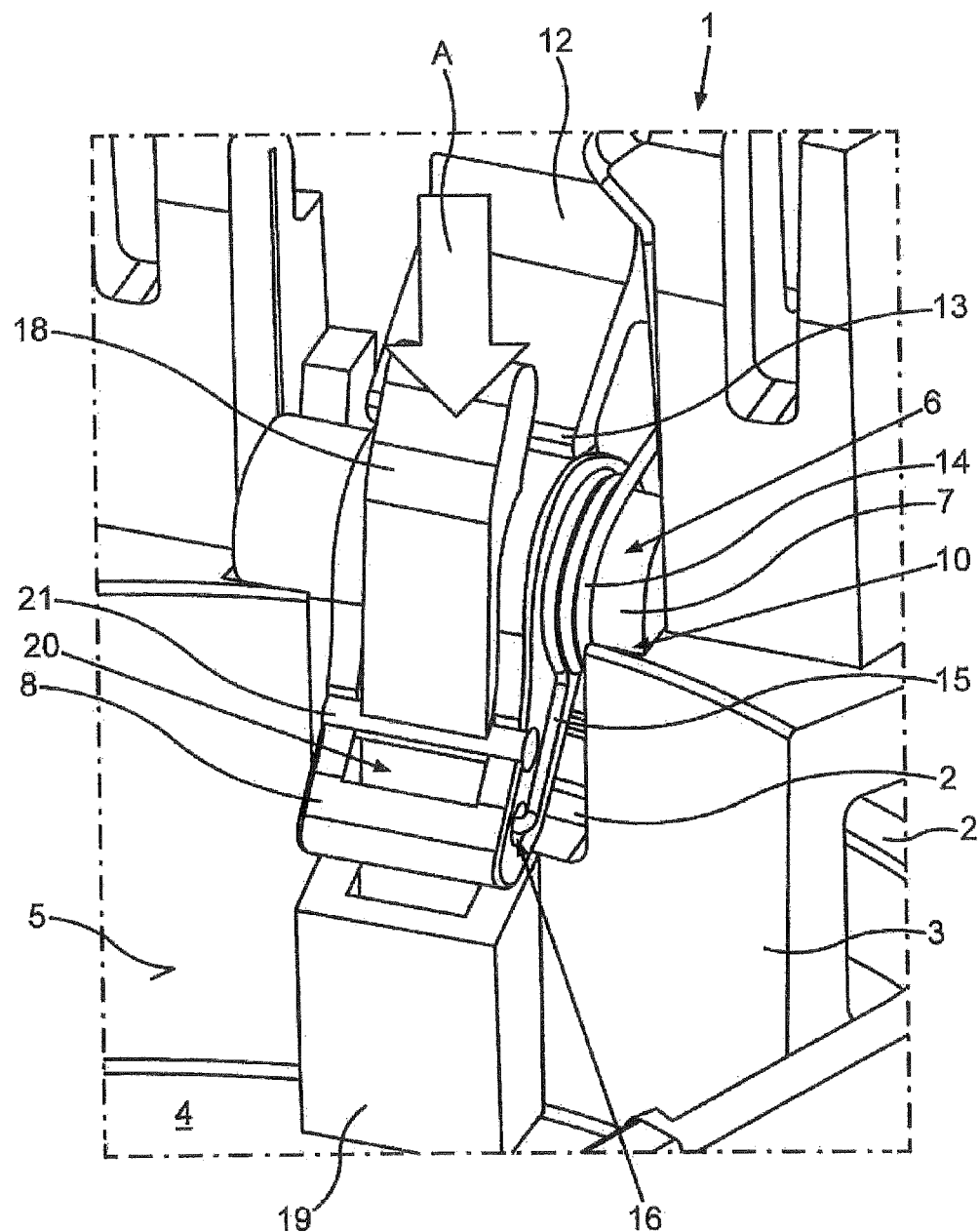
FIG. 2 is a schematic and perspective illustration of the connecting device, wherein the locking element is situated in an operating position.
Figure 3:
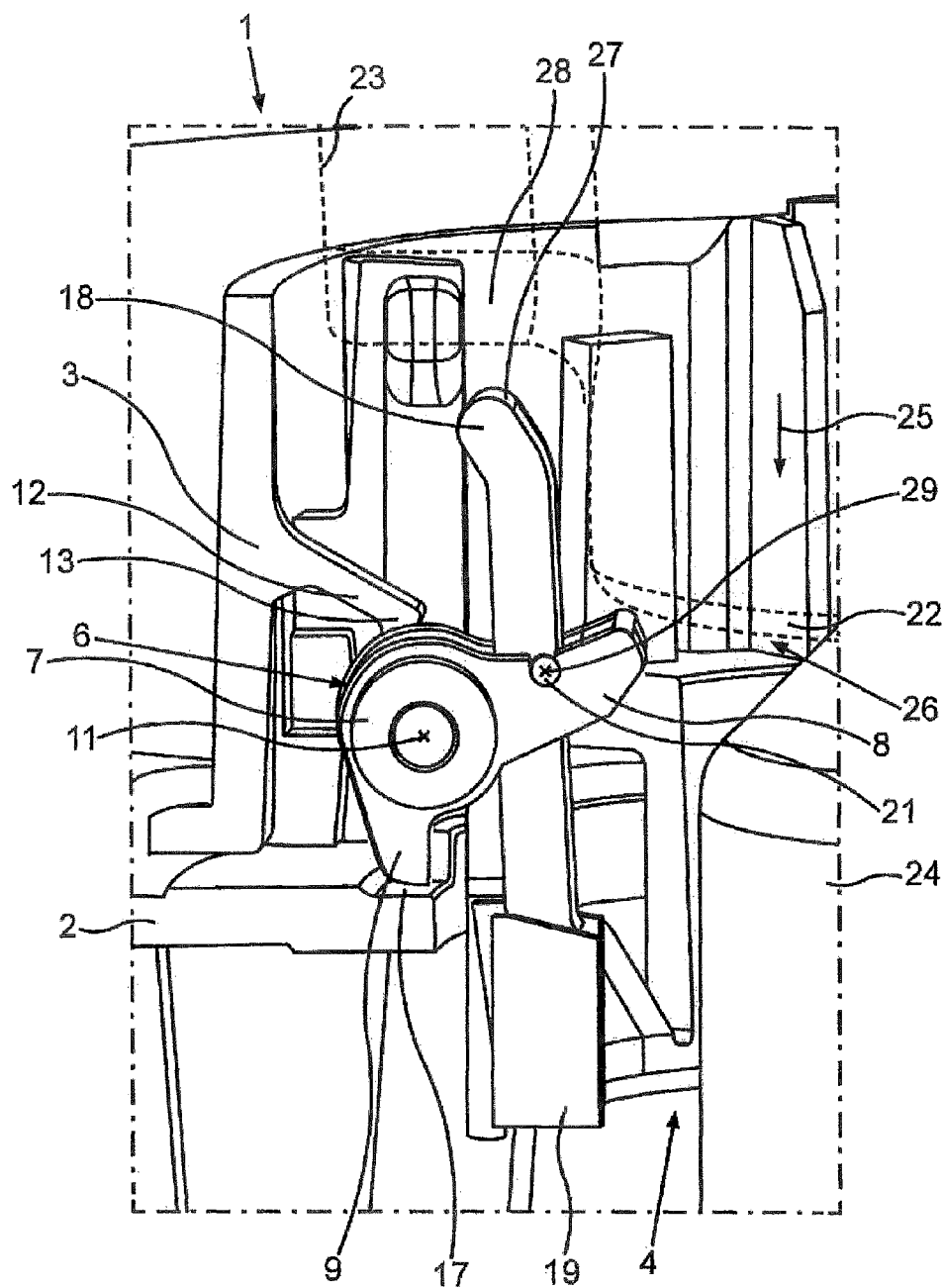
FIGS. 3 to 6 are schematic illustrations of a side view and sectional view through the connecting device, wherein the movement sequence from the installation position into the operating position will be discussed in more detail.
Figure 6:
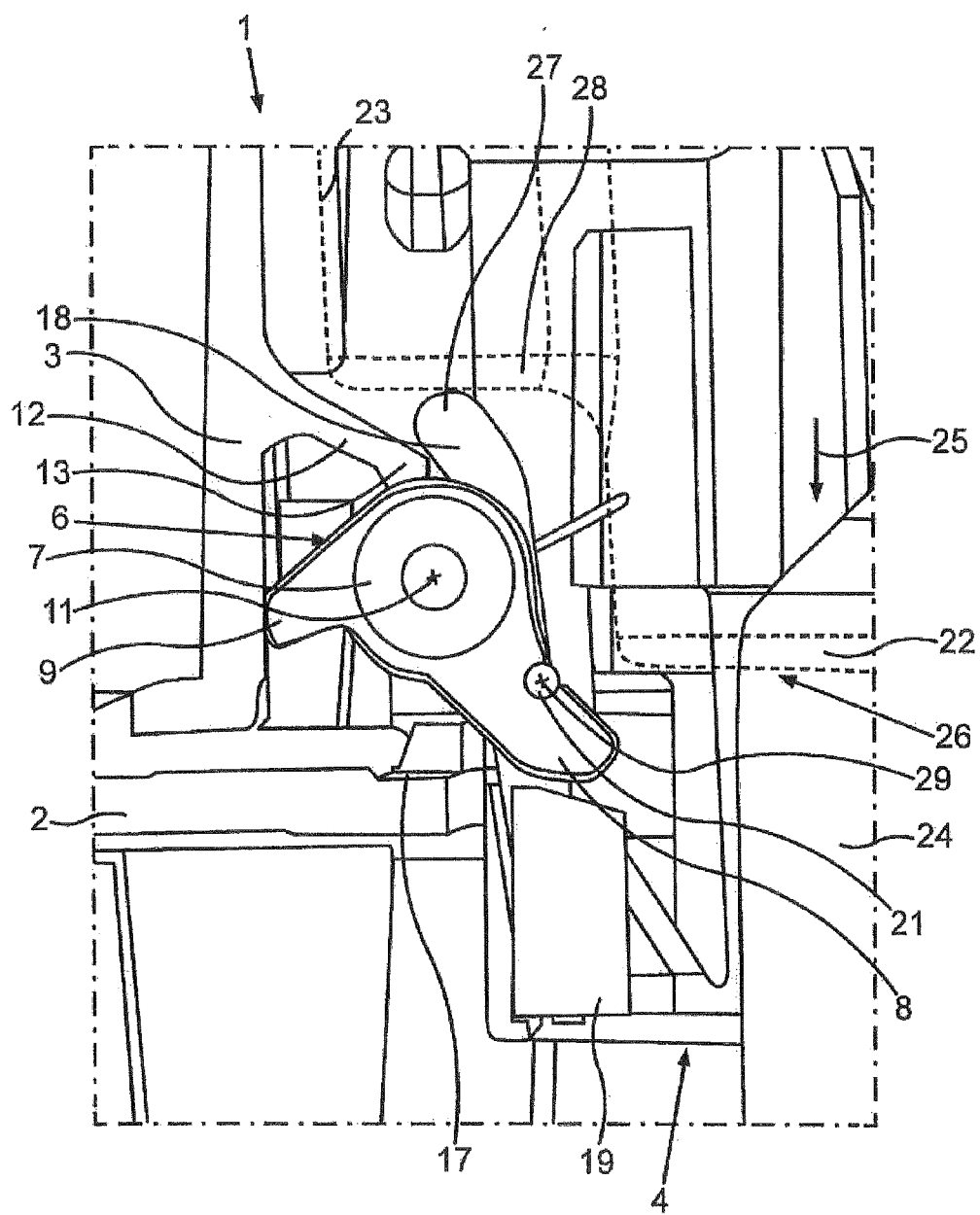

During the insertion of the hub of the steering wheel into the cavity 4, the locking element 6 is pivoted, as per the illustrated arrow A, counter to the spring force of the leg spring 14 from an installation position illustrated in FIG. 1 into an operating position shown in FIG. 2. Here, the installation position constitutes a rest position of the locking element 6, in which the blocking bar 9 is situated in a depression 17 formed in the positionally fixed component 2. Therefore, in the installation position, the blocking bar 9 engages into the depression 17 and thus blocks the rotational movement of the hub part 3 relative to the positionally fixed component 2, as illustrated in FIG. 3. During the insertion of the steering wheel hub into the cavity 4, the locking element 6 is pivoted into the operating position, in which the blocking bar 9 is situated outside the depression 17 and enables the rotational movement of the hub part 3, as shown in FIG. 6. In the operating position as per FIG. 6, the locking element 6 is preloaded with the spring force, such that, after a renewed removal of the steering wheel, the locking element 6 is automatically moved into the installation position again.

Referring again to FIGS. 1 and 2, the connecting device 1 furthermore has a plunger 18 which is of elongate form and which is arranged in sections in a guide part 19, and displaceably mounted or seated therein. The plunger 18 extends with its main direction of extent substantially along the axis of rotation of the hub part 3, and is also mounted in the guide part 19 so as to be displaceable along said axis of rotation of the hub part 3. Here, the plunger 18 extends through a through aperture 20 which is formed in the locking element 6. By way of a pin 21, the plunger 18 is furthermore articulated on the locking element 6. The locking element 6 can thus be pivoted relative to the plunger 18. Here, the pin 21 is attached to the plunger 18 and is arranged in a corresponding opening of the locking element 6.

The plunger 18 is mounted in the guide part 19 such that a certain freedom of movement in a radial direction with respect to the axis of rotation of the hub part 3 is also possible.

Figure 4:
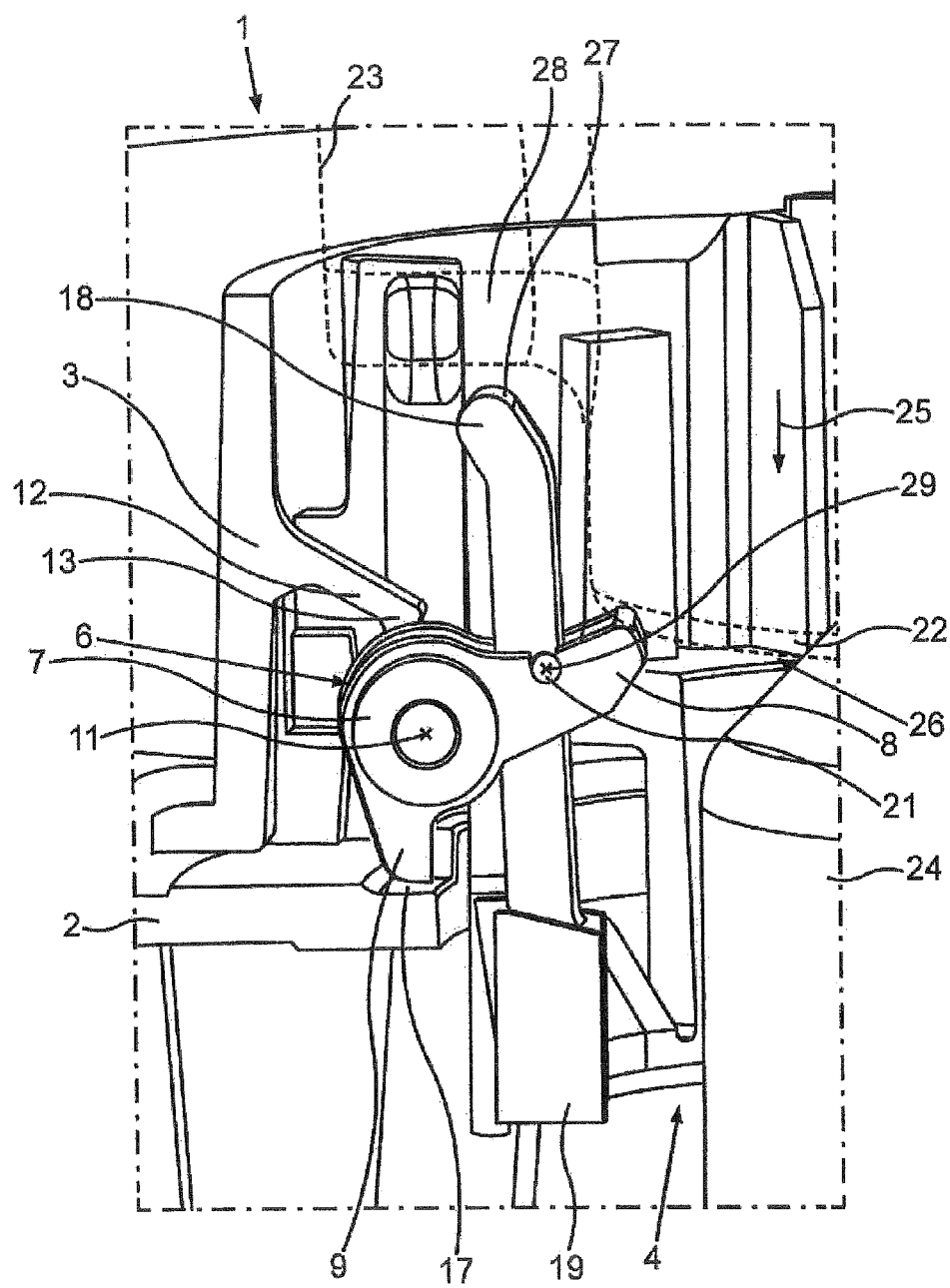

FIGS. 3 to 6 show how the locking element 6 is moved from the installation position into the operating position during the insertion of a hub 22 of a steering wheel, which is denoted overall by 23 and illustrated by way of dashed lines, into the cavity 4. Here, the hub 22 of the steering wheel 23 is fitted onto a shaft 24 of a steering column of the motor vehicle. In FIG. 3, the installation process of the steering wheel 23, in which the steering wheel 23 is installed onto the steering column in an axial direction as per the illustrated arrow 25, begins. The actuation section 8 of the locking element 6 is still axially spaced apart from a face side 26 of the hub 22. If the steering wheel 23 is moved further in the axial direction as per the illustrated arrow 25, the actuation section 8 of the locking element 6 is actuated by the axial face side 26 of the hub 22 and brought into contact therewith, as shown in FIG. 4. Here, a free end 27 of the plunger 18 is still axially spaced apart from the steering wheel 23, specifically from a steering wheel pot-shaped structure 28 on which the hub 22 is arranged.

Figure 5:
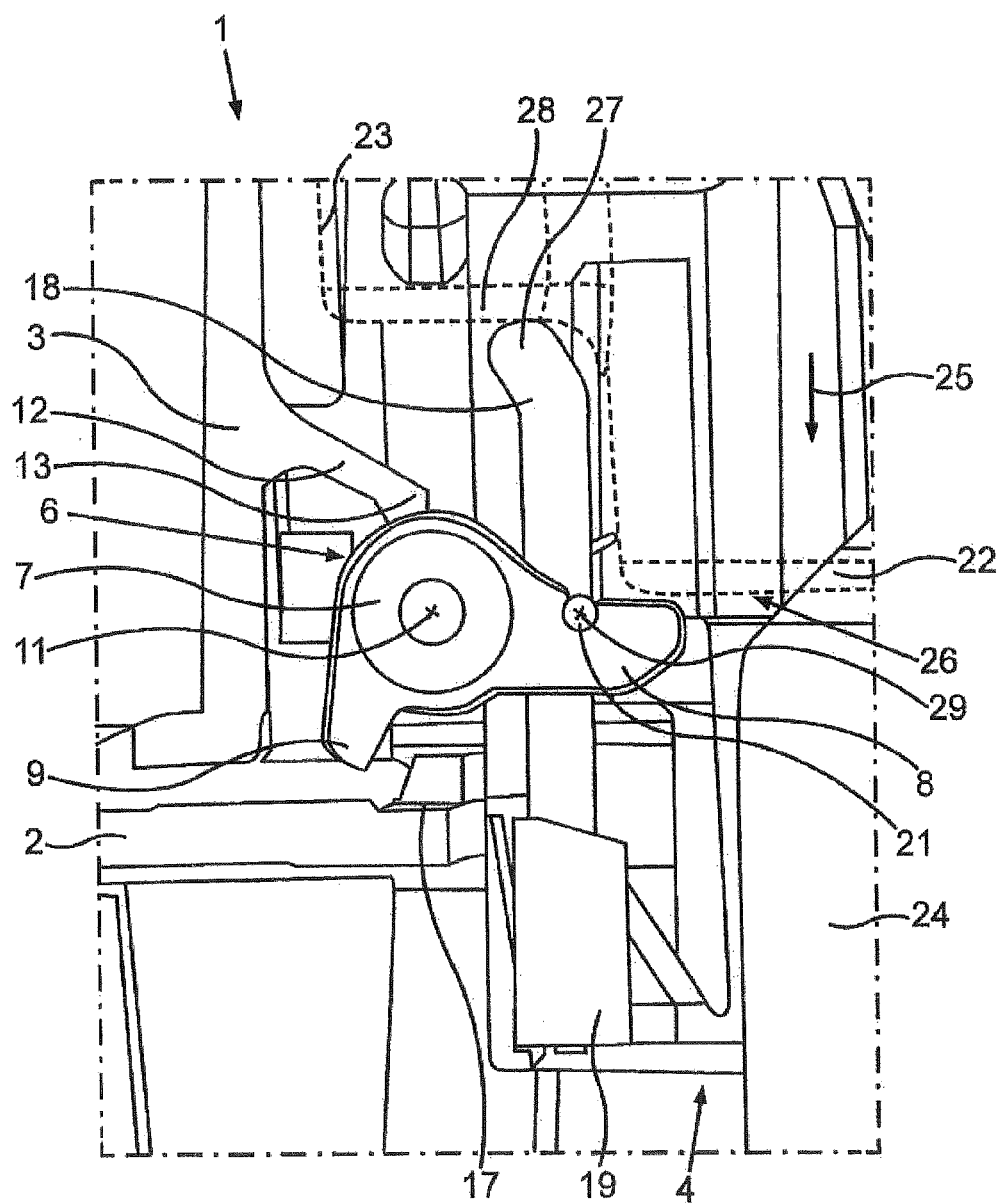

During further displacement of the steering wheel 23 in the axial direction, the free end 27 of the plunger 18 comes into contact with the steering wheel pot-shaped structure 28, as shown in FIG. 5. The steering wheel 23 now pushes the plunger 18, and via the plunger 18 also the locking element 6, further in the direction of the operating position. The actuation section 8 of the locking element 6 is moved away from the face side 26 of the hub 22, such that the locking element 6, or the actuation section 8, is axially spaced apart from the hub 22. As the steering wheel 23 is pushed further, the locking element 6 reaches its operating position as per FIG. 6, in which the actuation section 8 is spaced apart further from the hub 22, and the plunger 18 holds the locking element 6 in the operating position. Here, the plunger 18 remains in contact with the axial face surface of the steering wheel pot-shaped structure 28. Said contact is however acceptable with regard to the generation of noise, because the axial face surface of the steering wheel pot-shaped structure 28 can be lacquered or coated. Furthermore, only punctiform contact is produced between the free end 27 of the plunger 18 and the steering wheel pot-shaped structure 28, which can furthermore also be promoted by virtue of a stud or the like being formed on the free end 27 of the plunger 18.

As can be seen from FIGS. 3 to 6, the plunger 18 moves, overall, along the shaft 24 and thus in an axial direction with respect to the axis of rotation of the hub part 3. Furthermore, a slight pivoting movement of the plunger 18 can be seen. As has already been stated, the plunger 18 is mounted in the guide part 19 so as to also be movable slightly in a radial direction, and thus perpendicular to the axis of rotation of the hub part 3, in order to permit a reliable pivoting movement of the locking element 6 away from the hub 22.

As can also be seen from FIGS. 4 to 6, the plunger 18 is mounted or articulated on the locking element 6 so as to be pivotable about a pivot axis 29 which is arranged parallel to the cylinder longitudinal axis 11, about which the cylindrical main body 7 of the locking element 6 is pivotably mounted.

By way of the additional plunger 18, it is thus achieved, overall, that the actuation section 8 of the locking element 6 can be kept spaced apart from the hub 22 of the steering wheel 23 by a relatively great distance. In this way, generation of noise during the operation of the motor vehicle can be reliably prevented, because no contact occurs between the locking element 6 and the steering wheel 23.

The invention claimed is:

1. A connecting device for transmitting electrical signals to and/or from a steering wheel of a motor vehicle, comprising:
   a positionally fixed component for positionally fixed installation in the motor vehicle;
   a hub part which is rotatably mounted on the positionally fixed component and which serves for connection to the steering wheel;
   a locking element which is movably mounted on a bearing part and which, during the connection of the hub part to the steering wheel, is movable counter to a spring force of a spring element from an installation position, in which a blocking bar of the locking element blocks the rotation of the hub part relative to the positionally fixed component into an operating position, in which the rotation of the hub part is enabled; and
   a plunger which is mounted movably relative to the locking element and which, during the connection of the hub part to the steering wheel, moves the locking element into the operating position, in which the locking element is held spaced apart from the steering wheel by the plunger.

2. The connecting device according to claim 1, wherein during the connection of the hub part to the steering wheel, the locking element is initially in contact with the steering wheel and movable by way of the steering wheel into an intermediate position in which the plunger is brought into contact with the steering wheel, and said locking element is subsequently movable by way of the plunger into the operating position.

3. The connecting device according to claim 1, wherein the locking element is mounted on the bearing part so as to be pivotable between the installation position and the operating position.

4. The connecting device according to claim 1, wherein the plunger is displaceably mounted on and/or in a guide part.

5. The connecting device according to claim 1, wherein the locking element is articulated on the plunger.

6. The connecting device according to claim 1, wherein the plunger is of elongate form and is mounted so as to be movable along its main direction of extent, wherein the locking element has a through aperture through which the plunger extends.

7. The connecting device according to claim 1, wherein the spring element is in the form of a leg spring which is coiled around a main body of the locking element, wherein a first leg of the leg spring is supported on the locking element, and a second kg of the kg spring is supported on the bearing part.

8. The connecting device according to claim 1, wherein the bearing part is formed integrally with the hub part, such that the locking element is pivotably mounted, on the hub part.

9. The connecting device according to claim 1, wherein the bearing part has a receptacle into which a main body of the locking element is inserted.

10. The connecting device according to claim 9, wherein the bearing part has a holding arm of resilient form, which holding arm hears against the main body RUM of the locking element and by which holding arm the main body is held in the receptacle.

11. The connecting device according to claim 1, wherein the locking element is arranged on the bearing part so as to be releasable in non-destructive fashion.

12. The connecting device according to claim 1, further comprising a depression which is formed in particular in the positionally fixed component and into which, in the installation position of the locking element, the blocking bar engages in order to block the rotation of the hub part.

13. A motor vehicle having a connecting device according to claim 1.

14. A method for installing a steering wheel on a steering column of a motor vehicle, comprising:
   arranging a positionally fixed component of a connecting device for the transmission of electrical signals to and/or from the steering wheel in positionally fixed fashion on the steering column; and rotatably mounting a hub part of the connecting device on the positionally fixed component, which huh part is connected rotationally conjointly to the steering wheel, wherein, during the connection of the hub part to the steering wheel, a locking element, which is movably mounted on a bearing part of the connecting device, is moved counter to a spring force of a spring element from an installation position, in which a blocking bar of the locking element blocks the rotation of the hub part relative to the positionally fixed component, into an operating position, in which the rotation of the hub part is enabled, wherein, during the connection of the huh part to the steering wheel, a plunger which is mounted movably relative to the locking element moves the locking element into the operating position, in which the locking element is held spaced apart from the steering wheel by the plunger.

* * * * *

UNITED STATES PATENT AND TRADEMARK OFFICE
CERTIFICATE OF CORRECTION

PATENT NO. : 9,783,141 B2  
APPLICATION NO. : 15/027043  
DATED : October 10, 2017  
INVENTOR(S) : Tim Ullmann et al.

Page 1 of 1

It is certified that error appears in the above-identified patent and that said Letters Patent is hereby corrected as shown below:

On the Title Page

In the Applicant Section, Line number 1, the word "Sorensen" should read -- Sensoren --.

In the Claims

At Column 10, Claim number 7, Line number 40, the words "kg of the kg" should read -- leg of the leg --.

At Column 10, Claim number 10, Line number 51, the word "RUM" should be omitted.

At Column 11, Claim number 14, Line number 4, the word "huh" should read -- hub --.

At Column 11, Claim number 14, Line number 15, the word "huh" should read -- hub --.

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*